United States Patent
Bonnet et al.

(10) Patent No.: US 12,416,061 B2
(45) Date of Patent: *Sep. 16, 2025

(54) METHOD FOR MANUFACTURING A THERMALLY TREATED STEEL SHEET

(71) Applicant: ArcelorMittal, Luxembourg (LU)

(72) Inventors: Frédéric Bonnet, Avril (FR); Yannick Doh, Montigny-les-Metz (FR)

(73) Assignee: ArcelorMittal, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,036

(22) Filed: Feb. 15, 2023

(65) Prior Publication Data

US 2024/0026491 A1    Jan. 25, 2024

Related U.S. Application Data

(63) Continuation of application No. 16/469,231, filed as application No. PCT/IB2017/058190 on Dec. 20, 2017, now abandoned.

(30) Foreign Application Priority Data

Dec. 20, 2016  (WO) ................. PCT/IB2016/001787

(51) Int. Cl.
  *C21D 11/00*    (2006.01)
  *B32B 15/01*    (2006.01)
  (Continued)

(52) U.S. Cl.
  CPC .......... *C21D 11/005* (2013.01); *B32B 15/012* (2013.01); *B32B 15/013* (2013.01);
  (Continued)

(58) Field of Classification Search
  None
  See application file for complete search history.

(56) References Cited

U.S. PATENT DOCUMENTS 4,440,583 A    4/1984 Kegami et al.
5,891,275 A    4/1999 Elfmark et al.
(Continued)

FOREIGN PATENT DOCUMENTS

CN    1205920      1/1999
CN    102851474 A  1/2013
(Continued)

OTHER PUBLICATIONS

Machine translation of WO2010/049600. (Year: 2010).*
(Continued)

*Primary Examiner* — Xiaowei Su
(74) *Attorney, Agent, or Firm* — Davidson Kappel LLC

(57) ABSTRACT

A method for manufacturing a thermally treated steel sheet is described. The method includes:
  A. preparation step containing:
    1) a selection substep, wherein:
      a. $m_{target}$ and a chemical composition are compared to a list of predefined products, whose microstructure contains predefined phases and predefined proportion of phases, and a product having a microstructure $m_{standard}$ closest to $m_{target}$ and $TP_{standard}$ is selected, including at least a heating, a soaking and a cooling steps, to obtain $m_{standard}$,
      b. a heating path, a soaking path including a soaking temperature $T_{soaking}$, a power cooling of the cooling system and a cooling temperature $T_{cooling}$ are selected based on $TP_{standard}$ and
    2) a calculation substep, wherein through variation of the cooling power, new cooling paths $CP_x$ are calculated based on the product selected in step A.1)a and $TP_{standard}$, the initial microstructure $m_i$ of the steel sheet to reach $m_{target}$, the heating path, the soaking path comprising $T_{soaking}$ and $T_{cooling}$, the
    (Continued)

cooling step of $TP_{standard}$ is recalculated using said $CP_x$ in order to obtain new thermal paths $TP_x$, each $TP_x$ corresponding to a microstructure $m_x$, 3) a selection substep wherein one $TP_{target}$ to reach $m_{target}$ is selected, $TP_{target}$ being chosen among the calculated thermal paths $TP_x$ and being selected such that $m_x$ is the closest to $m_{target}$, and B. a thermal treatment step wherein $TP_{target}$ is performed on the steel sheet.

35 Claims, 4 Drawing Sheets

(51) Int. Cl.

| | |
|---|---|
| *C21D 1/667* | (2006.01) |
| *C21D 6/00* | (2006.01) |
| *C21D 8/02* | (2006.01) |
| *C21D 9/46* | (2006.01) |
| *C23C 2/06* | (2006.01) |
| *C23C 2/12* | (2006.01) |
| *C23C 2/28* | (2006.01) |

(52) U.S. Cl.
CPC .............. *C21D 1/667* (2013.01); *C21D 6/005* (2013.01); *C21D 6/008* (2013.01); *C21D 8/0205* (2013.01); *C21D 8/0236* (2013.01); *C21D 9/46* (2013.01); *C23C 2/06* (2013.01); *C23C 2/12* (2013.01); *C23C 2/29* (2022.08); *C21D 2211/001* (2013.01); *C21D 2211/002* (2013.01); *C21D 2211/005* (2013.01); *C21D 2211/008* (2013.01)

(56) References Cited

U.S. PATENT DOCUMENTS

| | | | |
|---|---|---|---|
| 11,692,237 B2 * | 7/2023 | Bonnet | C22C 38/001 |
| | | | 148/503 |
| 11,932,916 B2 * | 3/2024 | Bonnet | B22D 11/202 |
| 2009/0315228 A1 | 12/2009 | Pasquinet et al. | |
| 2016/0208359 A1 | 7/2016 | Kasuya et al. | |
| 2017/0130291 A1 | 5/2017 | Arlazarov et al. | |
| 2020/0040426 A1 * | 2/2020 | Bonnet | C21D 11/005 |

FOREIGN PATENT DOCUMENTS

| | | |
|---|---|---|
| CN | 2013000766 A | 1/2013 |
| CN | 105579606 A | 5/2016 |
| EA | 200870280 A1 | 2/2009 |
| EP | 0453566 | 10/1991 |
| JP | H1036923 A | 2/1998 |
| JP | H10158747 B2 | 6/1998 |
| JP | 2000160290 A | 6/2000 |
| JP | 2008007809 B2 | 1/2008 |
| JP | 2008161924 B2 | 7/2008 |
| JP | 5693392 B2 | 4/2015 |
| RU | 2518039 C2 | 6/2014 |
| WO | WO 2010049600 A1 | 5/2010 |
| WO | WO2016016683 | 2/2016 |

OTHER PUBLICATIONS

The International Preliminary Report issued in connection with International application No. PCT/IB2017/058190 on Mar. 4, 2019.
The International Search Report issued in connection with International application No. PCT/IB2017/058190 on Nov. 6, 2018.

* cited by examiner

METHOD FOR MANUFACTURING A THERMALLY TREATED STEEL SHEET

This is a continuation of U.S. patent application Ser. No. 16/469,231 filed on Jun. 13, 2019, now published as U.S. US 2020/0032368 A1, which is a national phase of PCT/IB2017/058190, filed on Dec. 20, 2017 which claims priority to International Patent Application PCT/IB2016/001787, filed on Dec. 20, 2016. All of the above are hereby incorporated by reference herein.

FIELD OF THE INVENTION

The present invention relates to a method for manufacturing a thermally treated steel sheet having a microstructure $m_{target}$ in a heat treatment line. The invention is particularly well suited for the manufacture of automotive vehicles.

BACKGROUND

It is known to use coated or bare steel sheets for the manufacture of automotive vehicles. A multitude of steel grades are used to manufacture a vehicle. The choice of steel grade depends on the final application of the steel part. For example, IF (Interstitial-Free) steels can be produced for an exposed part, TRIP (Transformation-Induced Plasticity) steels can be produced for seat and floor cross members or A-pillars, and DP (Dual Phase) steels can be produced for rear rails or roof cross member.

During production of theses steels, crucial treatments are performed on the steel in order to obtain the desired part having excepted mechanical properties for one specific application. Such treatments can be, for example, a continuous annealing before deposition of a metallic coating or a quenching and partitioning treatment. In these treatments, the cooling step is important because the microstructure and the mechanical properties of steels mostly depend on the performed cooling treatment. Usually, the treatment including the cooling step to perform is selected in a list of known treatments, this treatment being chosen depending on the steel grade.

Patent application WO2010/049600 relates to a method of using an installation for heat treating a continuously moving steel strip, comprising the steps of: selecting a cooling rate of the steel strip depending on, among others, metallurgical characteristics at the entry and metallurgical characteristics required at the exit of the installation; entering the geometric characteristics of the band; calculating power transfer profile along the steel route in the light with the line speed; determining desired values for the adjustment parameters of the cooling section, and adjusting the power transfer of the cooling devices of the cooling section according to said monitoring values.

However, this method is only based on the selection and the application of well-known cooling cycles. It means that for one steel grade, for example TRIP steels, there is a huge risk that the same cooling cycle is applied even if each TRIP steel has its own characteristics comprising chemical composition, microstructure, properties, surface texture, etc. Thus, the method does not take into account the real characteristics of the steel. It allows for the non-personalized cooling of a multitude of steel grades.

Consequently, the cooling treatment is not adapted to one specific steel and therefore at the end of the treatment, the desired properties are not obtained. Moreover, after the treatment, the steel can have a big dispersion of the mechanical properties. Finally, even if a wide range of steel grades can be manufactured, the quality of the cooled steel is poor.

SUMMARY OF THE INVENTION

Thus, an object of various embodiments of the present invention is to solve the above drawbacks by providing a method for manufacturing a thermally treated steel sheet having a specific chemical steel composition and a specific microstructure $m_{target}$ to reach in a heat treatment line. In particular, an object of various embodiments of the present invention is to perform a cooling treatment adapted to each steel sheet, such treatment being calculated very precisely in the lowest calculation time possible in order to provide a thermally treated steel sheet having the excepted properties, such properties having the minimum of properties dispersion possible.

The invention provides a method for manufacturing a thermally treated steel sheet having a microstructure $m_{target}$ comprising from 0 to 100% of at least one phase chosen among: ferrite, martensite, bainite, pearlite, cementite and austenite, in a heat treatment line comprising a heating section, a soaking section and a cooling section including a cooling system, wherein a thermal path $TP_{target}$ is performed, such method comprising:

A. a preparation step comprising:
1) a selection substep wherein:
   a. $m_{target}$ and the chemical composition are compared to a list of predefined products, whose microstructure includes predefined phases and predefined proportion of phases, in order to select a product having a microstructure $m_{standard}$ closest to $m_{target}$ and $TP_{standard}$, comprising at least a heating, a soaking and a cooling steps, to obtain $m_{standard}$,
   b. a heating path, a soaking path including a soaking temperature $T_{soaking}$, the power cooling of the cooling system and a cooling temperature $T_{cooling}$ are selected based on $TP_{standard}$ and
2) a calculation substep wherein through variation of the cooling power, new cooling paths $CP_x$ are calculated based on the selected product in step A.1)a and $TP_{standard}$, the initial microstructure $m_i$ of the steel sheet to reach $m_{target}$, the heating path, the soaking path comprising $T_{soaking}$ and $T_{cooling}$, the cooling step of $TP_{standard}$ being recalculated using said $CP_x$ in order to obtain new thermal paths $TP_x$, each $TP_x$ corresponding to a microstructure $m_x$,
3) a selection step wherein one $TP_{target}$ to reach $m_{target}$ is selected, $TP_{target}$ being chosen among the calculated thermal paths $TP_x$ and being selected such that $m_x$ is the closest to $m_{target}$ and B. a thermal treatment step wherein $TP_{target}$ is performed on the steel sheet.

In some embodiments, the predefined phases in step A.1), are defined by at least one element chosen from: the size, the shape, a chemical and the composition.

In some embodiments, $TP_{standard}$ further comprises a pre-heating step.

In some embodiments, $TP_{standard}$ further comprises a hot-dip coating step, an overaging step a tempering step or a partitioning step.

In some embodiments, the microstructure $m_{target}$ comprises:
   100% of austenite,
   from 5 to 95% of martensite, from 4 to 65% of bainite, the balance being ferrite, from 8 to 30% of residual austenite, from 0.6 to 1.5% of carbon in solid solution, the balance being ferrite, martensite, bainite, pearlite and/or cementite, from 1% to 30% of ferrite and from 1% to 30% of bainite, from 5 and 25% of austenite, the balance being martensite, from 5 to 20% of residual austenite, the balance being martensite, ferrite and residual austenite, residual austenite and intermetallic phases, from 80 to 100% of martensite and from 0 to 20% of residual austenite 100% martensite, from 5 to 100% of pearlite and from 0 to 95% of ferrite, and at least 75% of equiaxed ferrite, from 5 to 20% of martensite and bainite in amount less than or equal to 10%.

In some embodiments, said predefined product types include Dual Phase, Transformation Induced Plasticity, Quenched & Partitioned steel, Twins Induced Plasticity, Carbide Free Bainite, Press Hardening Steel, TRIPLEX, DUPLEX and Dual Phase High Ductility DP.

In some embodiments, in step A.2), the cooling power of the cooling system varies from a minimum to a maximum value.

In some embodiments, in step A.2), the cooling power of the cooling system varies from a maximum to a minimum value.

In some embodiments, in step A.1.b), $T_{soaking}$ is a fixed number selected from the range between 600 to 1000° C.

In some embodiments, in step A.1.b), $T_{soaking}$ varies from 600 to 1000° C.

In some embodiments, after step A.2), a further calculation substep is performed wherein:

a) $T_{soaking}$ varies from in a predefined range value chosen from 600 to 1000° C. and b) For each $T_{soaking}$ variation, new cooling paths $CP_x$ are calculated, based on the selected product in step A.1.a) and $TP_{standard}$, the initial microstructure $m_i$ of the steel sheet to reach $m_{standard}$ and $T_{cooling}$, the cooling step of $TP_{standard}$ being recalculated using said $CP_x$ in order to obtain new thermal paths $TP_x$, each $TP_x$ corresponding to a microstructure $m_x$.

In some embodiments, in the selection step A.3), the selected $TP_{target}$ further includes the value of $T_{soaking}$.

In some embodiments, in step A.3), when at least two $CP_x$ have their $m_x$ equal, the selected $TP_{target}$ selected is the one having the minimum cooling power needed.

In some embodiments, in step A.2), the differences between proportions of phase present in $m_{target}$ and $m_x$ is ±3%.

In some embodiments, in step A.2), the thermal enthalpy H released between $m_i$ and $m_{target}$ is calculated such that:

$H_{released}$=($X_{ferrite}$*$H_{ferrite}$)+($X_{martensite}$*$H_{martensite}$)+ ($X_{bainite}$*$H_{bainite}$)+($X_{pearlite}$*$H_{pearlite}$)+($H_{cementite}$+ $X_{cementite}$)+($H_{austenite}$+$X_{austenite}$), X being a phase fraction.

In some embodiments, in step A.2), the all cooling path $CP_x$ is calculated such that:

$$T(t + \Delta t) = T(t) + \frac{(\varphi_{Convection} + \varphi_{radiance})}{\rho \cdot Ep \cdot C_{pe}} \Delta t \pm \frac{H_{released}}{C_{pe}}$$

with $C_{pe}$: the specific heat of the phase (J·kg$^{-1}$·K$^{-1}$), ρ: the density of the steel (g·m$^{-3}$), Ep: thickness of the steel (m), φ: the heat flux (convective and radiative in W), $H_{releaased}$ (J·kg$^{-1}$), T: temperature (° C.) and t: time (s).

In some embodiments, in step A.2), at least one intermediate steel microstructure $m_{xint}$ corresponding to an intermediate cooling path $CP_{xint}$ and the thermal enthalpy $H_{xint}$ are calculated.

In some embodiments, in step A.2), $CP_x$ is the sum of all $CP_{xint}$ and $H_{released}$ is the sum of all $H_{xint}$.

In some embodiments, before step A.1.a), at least one targeted mechanical property $P_{target}$ is chosen among yield strength YS, Ultimate Tensile Strength UTS, elongation hole expansion, formability is selected.

In some embodiments, $m_{target}$ is calculated based on $P_{target}$.

In some embodiments, in step A.2), the process parameters undergone by the steel sheet before entering the heat treatment line are taken into account to calculate $CP_x$.

In some embodiments, the process parameters comprise at least one element chosen from among: a cold rolling reduction rate, a coiling temperature, a run out table cooling path, a cooling temperature and a coil cooling rate.

In some embodiments, in step A.2) the process parameters of the treatment line that the steel sheet will undergo in the heat treatment line are taken into account to calculate $CP_x$.

In some embodiments, the process parameters comprise at least one element chosen from among: a specific thermal steel sheet temperature to reach, the line speed, cooling power of the cooling sections, heating power of the heating sections, an overaging temperature, a cooling temperature, a heating temperature and a soaking temperature.

In some embodiments, the cooling system comprises at least one jet cooling, at least one cooling spray or at least both.

In some embodiments, the cooling system comprises at least one jet cooling, the jet cooling comprises spraying a gas, an aqueous liquid or a mixture thereof.

In some embodiments, the gas is chosen from air, $HN_x$, $H_2$, $N_2$, Ar, He, steam water or a mixture thereof.

In some embodiments, the aqueous liquid is chosen from water or a nanofluid.

In some embodiments, the jet cooling sprays air with a debit flow between 0 and 350000 Nm³/h.

In some embodiments, $T_{cooling}$ is the bath temperature when the cooling section is followed by a hot-dip coating section comprising a hot-dip bath.

In some embodiments, the bath is based on aluminum or based on zinc.

In some embodiments, $T_{cooling}$ is the quenching temperature $T_q$.

In some embodiments, $T_{cooling}$ is between 150 and 800° C.

In some embodiments, every time a new steel sheet enters into the heat treatment line, a new calculation step A.2) is automatically performed based on the selection step A.1) performed beforehand.

In some embodiments, an adaptation of the cooling path is performed as the steel sheet entries into the cooling section of the heat treatment line on the first meters of the sheet.

The present invention also provides a coil including said predefined product types including DP, TRIP, Q&P, TWIP, CFB, PHS, TRIPLEX, DUPLEX and DP HD, obtainable from the method methods described above, the coil having a standard variation of mechanical properties below or equal to 25 MPa between any two points along the coil. In some embodiments, a standard variation of the coil is below or equal to 15 MPa between any two points along the coil. In some embodiments, a standard variation of the coil is below or equal to 9 MPa between any two points along the coil.

The present invention further provides a thermal treatment line for the implementation of the methods described above.

In addition, the present invention provides a computer program product comprising at least a metallurgical module, an optimization module and a thermal module cooperating together to calculate $TP_{target}$ such modules comprising software instructions that when implemented by a computer implement the method according to claims.

Other characteristics and advantages of the present invention will become apparent from the following detailed description of the invention.

BRIEF DESCRIPTION OF THE DRAWINGS

To illustrate the invention, various embodiments and examples will be described, particularly with reference to the following Figures.

DETAILED DESCRIPTION

Figure 1:
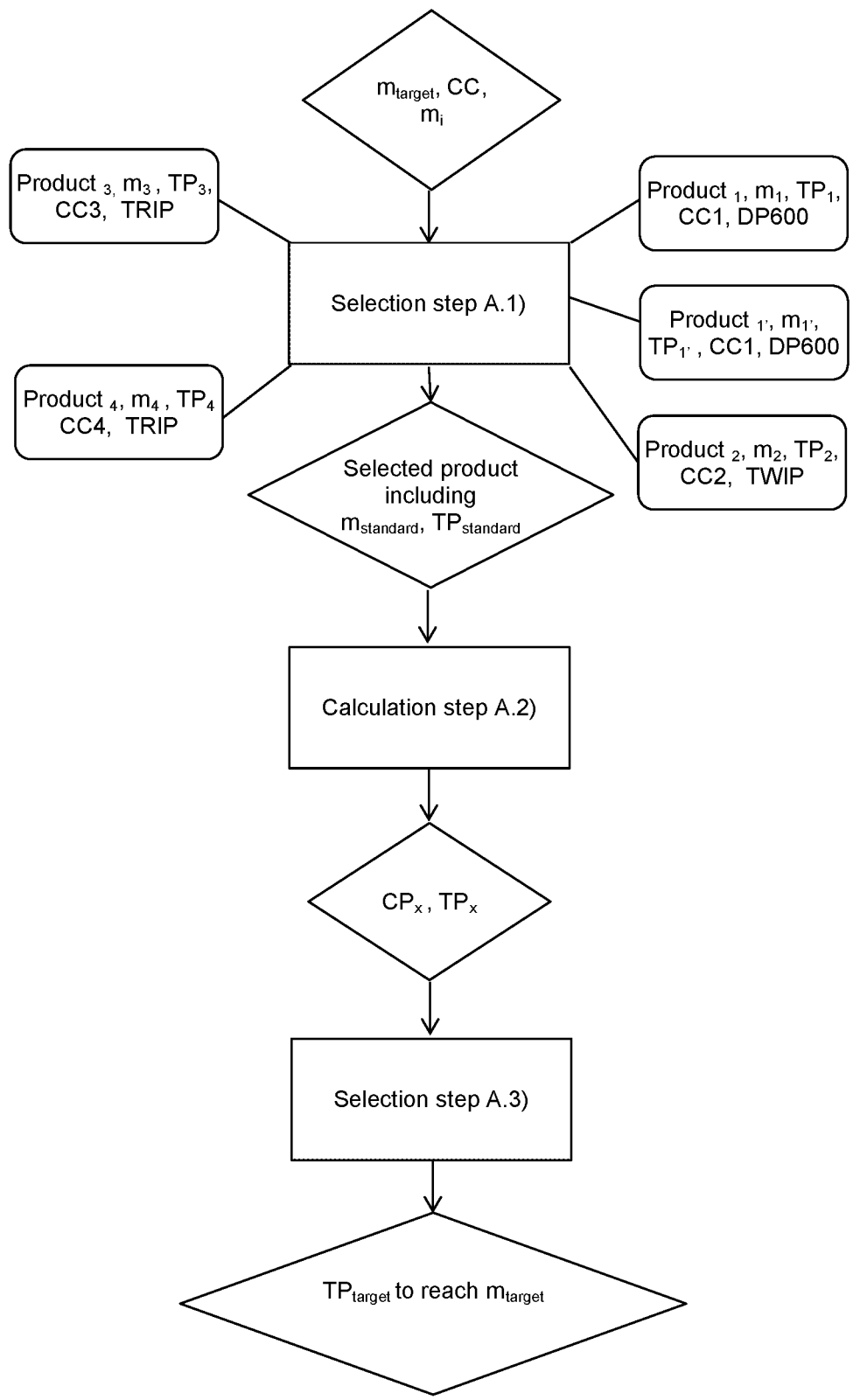
FIG. 1 illustrates an example of an embodiment of a method according to the present invention.

The following terms will be defined:
CC: chemical composition in weight percent,
$m_{target}$: targeted value of the microstructure,
$m_{standard}$: the microstructure of the selected product,
$P_{target}$: targeted value of a mechanical property,
$m_i$: initial microstructure of the steel sheet,
X: phase fraction in weight percent,
T: temperature in degree Celsius (° C.),
t: time (s),
s: seconds,
UTS: ultimate tensile strength (MPa),
YS: yield stress (MPa),
metallic coating based on zinc means a metallic coating comprising above 50% of zinc,
metallic coating based on aluminum means a metallic coating comprising above 50% of aluminum and
a heating path comprises a time, a temperature and a heating rate,
a soaking path comprises a time, a temperature and a soaking rate,
$TP_x$, $TP_{standard}$ and $TP_{target}$ comprise a time, a temperature of the thermal treatment and at least one element chosen from: a cooling, an isotherm or a heating rate, the isotherm rate having a constant temperature,
$CP_x$ and $CP_{xint}$ comprise a time, a temperature and a cooling rate and
nanofluids: fluid comprising nanoparticles.

The designation "steel" or "steel sheet" means a steel sheet, a coil, a plate having a composition allowing the part to achieve a tensile strength up to 2500 MPa and more preferably up to 2000 MPa. For example, the tensile strength is above or equal to 500 MPa, preferably above or equal to 1000 MPa, advantageously above or equal to 1500 MPa. A wide range of chemical composition is included since the method according to the invention can be applied to any kind of steel.

The invention provides a method for manufacturing a thermally treated steel sheet having a microstructure $m_{target}$ comprising from 0 to 100% of at least one phase chosen among: ferrite, martensite, bainite, pearlite, cementite and austenite, in a heat treatment line comprising a heating section, a soaking section and a cooling section including a cooling system, wherein a thermal path TP target tar g et is performed, such method comprising:

A. preparation step comprising:
1) a selection substep wherein:
   a. $m_{target}$ and the chemical composition are compared to a list of predefined products, whose microstructure includes predefined phases and predefined proportion of phases, in order to select a product having a microstructure $m_{standard}$ closest to $m_{target}$ and $TP_{standard}$, comprising at least a heating, a soaking and a cooling step, to obtain $m_{standard}$,
   b. a heating path, a soaking path including a soaking temperature $T_{soaking}$, the power cooling of the cooling system and a cooling temperature $T_{cooling}$ are selected based on $TP_{standard}$ and
2) a calculation substep wherein through variation of the cooling power, new cooling paths $CP_x$ are calculated based on the selected product in step A.1.a) and $TP_{standard}$, the initial microstructure mi of the steel sheet to reach $m_{target}$, the heating path, the soaking path comprising $T_{soaking}$ and $T_{cooling}$, the cooling step of $TP_{standard}$ being recalculated using said $CP_x$ in order to obtain new thermal paths $TP_x$, each $TP_x$ corresponding to a microstructure $m_x$,
3) a selection step wherein one $TP_{target}$ to reach $m_{target}$ is selected, $TP_{target}$ being chosen among the calculated thermal paths $TP_x$ and being selected such that $m_x$ is the closest to $m_{target}$ and B. a thermal treatment step wherein TP target tar g et is performed on the steel sheet.

Without willing to be bound by any theory, it seems that when a method according to various embodiments of the present invention is applied, it is possible to obtain a personalized thermal, in particular cooling path, for each steel sheet to treat in a short calculation time. Indeed, a method according to various embodiments of the present invention allows for a precise and specific cooling path which takes into account $m_{target}$, in particular the proportion of all the phases during the cooling path and $m_i$ (including the microstructure dispersion along the steel sheet). Indeed, the method according to various embodiments of the present invention takes into account for the calculation the thermodynamically stable phases, i.e. ferrite, austenite, cementite and pearlite, and the thermodynamic metastable phases, i.e. bainite and martensite. Thus, a steel sheet having the expected properties with the minimum of properties dispersion possible is obtained. Preferably, $TP_{standard}$ further comprises a pre-heating step.

In some embodiments, $TP_{standard}$ further comprises a hot-dip coating step, an overaging step a tempering step or a partitioning step.

In some embodiments, the microstructure $m_{target}$ to reach comprises:
100% of austenite,
from 5 to 95% of martensite, from 4 to 65% of bainite, the balance being ferrite, from 8 to 30% of residual austenite, from 0.6 to 1.5% of carbon in solid solution, the balance being ferrite, martensite, bainite, pearlite and/or cementite, from 1% to 30% of ferrite and from 1% to 30% of bainite, from 5 and 25% of austenite, the balance being martensite, from 5 to 20% of residual austenite, the balance being martensite, ferrite and residual austenite, residual austenite and intermetallic phases, from 80 to 100% of martensite and from 0 to 20% of residual austenite, 100% martensite, from 5 to 100% of pearlite and from 0 to 95% of ferrite, and at least 75% of equiaxed ferrite, from 5 to 20% of martensite and bainite in amount less than or equal to 10%.

In some embodiments, during the selection substep A.1), the chemical composition and $m_{target}$ are compared to a list of predefined products. The predefined products can be any kind of steel grade. For example, they may include Dual Phase DP, Transformation Induced Plasticity (TRIP), Quenched & Partitioned steel (Q&P), Twins Induced Plasticity (TWIP), Carbide Free Bainite (CFB), Press Hardening Steel (PHS), TRIPLEX, DUPLEX and Dual Phase High Ductility (DP HD).

The chemical composition depends on each steel sheet. For example, the chemical composition of a DP steel can comprise:

0.05<C<0.3%,
0.05≤Mn<3.0%,
S≤0.008%,
P≤0.080%,
N≤0.1%,
Si≤1.0%, the remainder of the composition making up of iron and inevitable impurities resulting from the development.

Each predefined product comprises a microstructure including predefined phases and predefined proportion of phases. In some embodiments, the predefined phases in step A.1) are defined by at least one element chosen from: the size, the shape and the chemical composition. Thus, $m_{standard}$ includes predefined phases in addition to predefined proportions of phase. Advantageously, $m_i$, $m_x$, $m_{target}$ include phases defined by at least one element chosen from: the size, the shape and the chemical composition.

According to an embodiment of the invention, the predefined product having a microstructure $m_{standard}$ closest to $m_{target}$ is selected as well as $TP_{standard}$ to reach $m_{standard}$. $m_{standard}$ comprises the same phases as $m_{target}$. Preferably, $m_{standard}$ also comprises the same phases proportions as $m_{target}$.

FIG. 1 illustrates an example according to an embodiment of the present invention, wherein the steel sheet to treat has the following CC in weight: 0.2% of C, 1.7% of Mn, 1.2% of Si and of 0.04% Al. $m_{target}$ comprises 15% of residual austenite, 40% of bainite and 45% of ferrite, from 1.2% of carbon in solid solution in the austenite phase. In the embodiment of the invention, CC and $m_{target}$ are compared to a list of predefined products chosen from among products 1 to 4. CC and $m_{target}$ correspond to product 3 or 4, such product being a TRIP steel.

Product 3 has the following $CC_3$ in weight: 0.25% of C, 2.2% of Mn, 1.5% of Si and 0.04% of Al. $m_3$, corresponding to $TP_3$, comprises 12% of residual austenite, 68% of ferrite and 20% of bainite, from 1.3% of carbon in solid solution in the austenite phase.

Product 4 has the following $CC_4$ in weight: 0.19% of C, 1.8% of Mn, 1.2% of Si and 0.04% of Al. $m_4$, corresponding to $TP_4$, comprises 12% of residual austenite and 45% of bainite and 43 of ferrite, from 1.1% of carbon in solid solution in the austenite phase.

Product 4 has a microstructure $m_4$ closest to $m_{target}$ since it has the same phases as $m_{target}$ in the same proportions. As shown in FIG. 1, two predefined products can have the same chemical composition CC and different microstructures. Indeed, $Product_1$ and $Product_{1'}$ are both DP600 steels (Dual Phase having a UTS of 600 MPa). One difference is that $Product_1$ has a microstructure $m_1$ and $Product_{1'}$ has a different microstructure $m_{1'}$. The other difference is that $Product_1$ has a YS of 360 MPa and $Product_{1'}$ has a YS of 420 MPa. Thus, it is possible to obtain steel sheets having different compromise UTS/YS for one steel grade.

Then, the power cooling of the cooling system, the heating path, the soaking path including the soaking temperature $T_{soaking}$ and the cooling temperature $T_{cooling}$ to reach are selected based on $TP_{standard}$.

During the calculation substep A.2), through variation of the cooling power, new cooling paths $CP_x$ are calculated based on the selected product in step A.1.a) and $TP_{standard}$, $m_i$ to reach $m_{target}$, the heating path, the soaking path comprising $T_{soaking}$ and $T_{cooling}$, the cooling step of $TP_{standard}$ being recalculated using said $CP_x$ in order to obtain new thermal paths $TP_x$, each $TP_x$ corresponding to a microstructure $m_x$. The calculation of $CP_x$ takes into account the thermal behavior and metallurgical behavior of the steel sheet when compared to the conventional methods wherein only the thermal behavior is considered. In the example of the embodiment of FIG. 1, product 4 is selected because $m_4$ is the closest to $m_{target}$, $m_4$ and $TP_4$ being respectively $m_{standard}$ and $TP_{standard}$.

Figure 2:
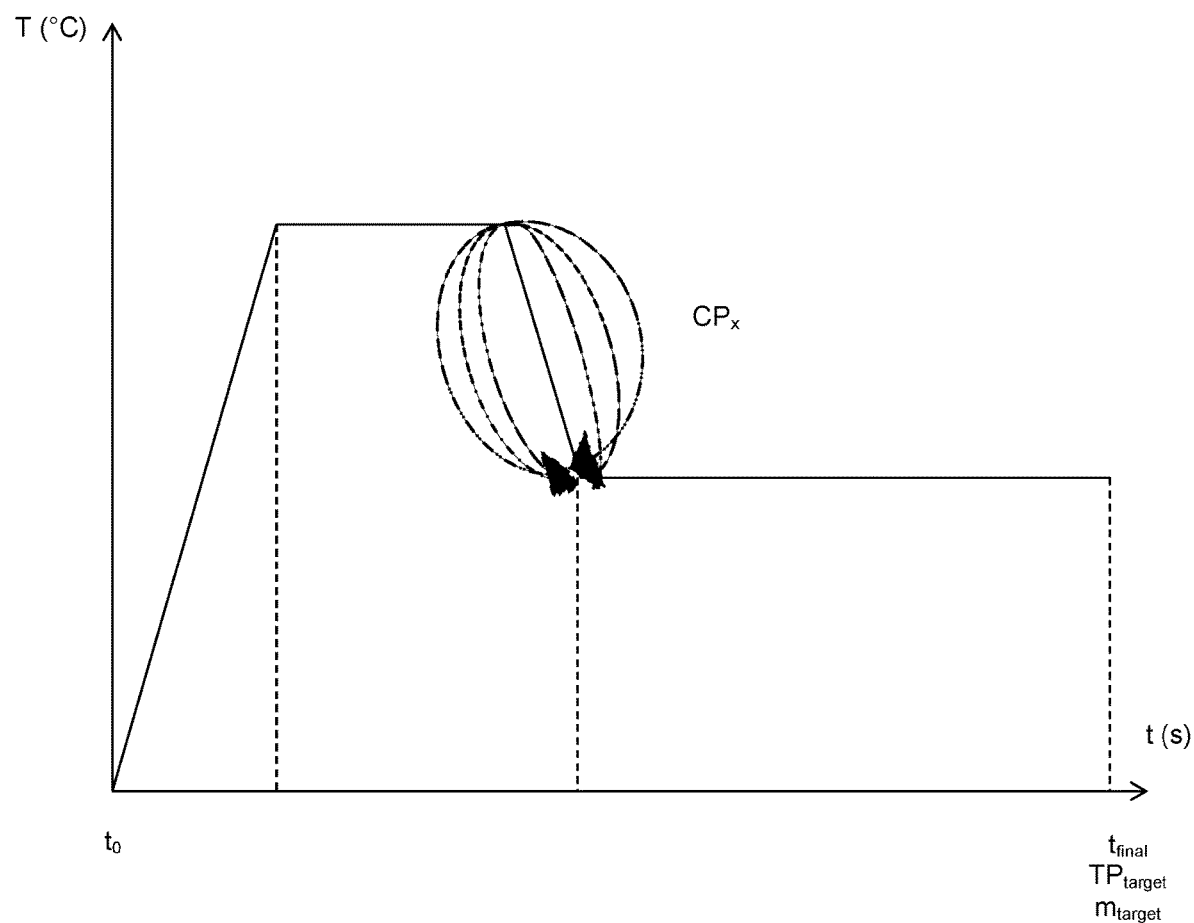
FIG. 2 illustrates an example of an embodiment of a method according to the present invention, wherein a continuous annealing of a steel sheet comprising a heating step, a soaking step, a cooling step and an overaging step is performed.

FIG. 2 illustrates a continuous annealing of a steel sheet comprising a heating step, a soaking step, a cooling step and an overaging step. A multitude of $CP_x$ is calculated so to obtain news thermal paths $TP_x$ and therefore one $TP_{target}$.

Preferably, in step A.2), the cooling power of the cooling system varies from a minimum to a maximum value. The cooling power can be determined by a flow rate of a cooling fluid, a temperature of a cooling fluid, the nature of cooling fluid and the thermal exchange coefficient, the fluid being a gas or a liquid.

In another embodiment, the cooling power of the cooling system varies from a maximum to a minimum value.

For example, the cooling system comprises at least one jet cooling, at least one cooling spray or at least both. Preferably, the cooling system comprises at least one jet cooling, the jet cooling spraying a fluid being a gas, an aqueous liquid or a mixture thereof. For example, the gas is chosen from air, $HN_x$, $H_2$, $N_2$, Ar, He, steam water or a mixture thereof. For example, the aqueous liquid is chosen from: water or nanofluids.

In some embodiments, jets cooling spray gas with a flow rate between 0 and 350000 $Nm^3/h$. The number of jets cooling present in the cooling section depends on the heat treatment line, it can vary from 1 to 25, preferably from 1 to 20, advantageously from 1 to 15 and more preferably between from 1 and 5. The flow rate depends on the number of jets cooling. For example, the flow rate of one jet cooling is between 0 and 50000 $Nm^3/h$, preferably between 0 and 40000 $Nm^3/h$, more preferably between 0 and 20000 $Nm^3/h$.

When the cooling section comprises jets cooling, the variation of cooling power is based on the flow rate. For example, for one jet cooling, 0 Nm³/h corresponds to a cooling power of 0% and 40000 Nm³/h corresponds to a cooling power of 100%.

Thus, for example, the cooling power of one jet cooling varies from a 0 Nm³/h, i.e. 0%, to 40000 Nm³/h, i.e. 100%. The minimum and maximum value of the cooling power can be any value chosen in the range of 0 to 100%. For example, the minimum value is of 0%, 10%, 15% or 25%. For example, the maximum value is of 80%, 85%, 90% or 100%.

When the cooling section comprises at least 2 jets cooling, the cooling power can be the same or different on each jet cooling. It means that each jet cooling can be configured independently of one other. For example, when the cooling section comprising 11 jets cooling, the cooling power of the three first jets cooling can be of 100%, the cooling power of the following four can be of 45% and the cooling power of the last four can be of 0%.

For example, the variation of the cooling power has an increment between 5 to 50%, preferably between 5 to 40%, more preferably between 5 to 30% and advantageously between 5 to 20%. The cooling power increment is, for example, of 10%, 15% or 25%.

When the cooling section comprises at least 2 jets cooling, the cooling power increment can be the same or different on each jet cooling. For example, in step A.2), the cooling power increment can be of 5% on all the jets cooling. In another embodiment, the cooling power increment can be of 5% for the three first jets, 20% for the following four and 15% for the last four. Preferably, the cooling power increment is different for each jet cooling, for example 5% for the first jet, 20% for the second jet, 0% for the third jet, 10% for the fourth jet, 0% for the fifth jet, 35% of the sixth jet, etc.

In one embodiment, the cooling systems are configured depending on the phase transformation independently of one other. For example, when the cooling system comprises 11 jets cooling, the cooling power of the three first jets cooling can be configured for the transformation, the cooling power of the following four can be configured for the transformation of austenite into perlite and the cooling power of the last four can be configured for the transformation of austenite into bainite. In another embodiment, the cooling power increment can be different for each jet cooling.

In some embodiments, in step A.1.b), $T_{soaking}$ is a fixed number selected from the range between 600 to 1000° C. For example, $T_{soaking}$ can be of 700° C., 800° C. or 900° C. depending on the steel sheet.

In other embodiments, $T_{soaking}$ varies from 600 to 1000° C. For example, $T_{soaking}$ can vary from 650 to 750° C. or from 800 to 900° C. depending on the steel sheet.

In some embodiments, when $T_{soaking}$ varies after step A.2), a further calculation substep is performed such that:

a. $T_{soaking}$ varies from in a predefined range value chosen from 600 to 1000° C. and
b. For each $T_{soaking}$ variation, new cooling paths $CP_x$ are calculated, based on the selected product in step A.1.a) and $TP_{standard}$, the initial microstructure $m_i$ of the steel sheet to reach $m_{standard}$ and $T_{cooling}$, the cooling step of $TP_{standard}$ being recalculated using said $CP_x$ in order to obtain new thermal paths $TP_x$, each $TP_x$ corresponding to a microstructure $m_x$.

Indeed, with the method according to various embodiments of the present invention, the variation of $T_{soaking}$ is taken into consideration for the calculation of $CP_x$. Thus, for each temperature of soaking, a multitude of new cooling paths $CP_x$ is calculated.

Preferably, at least 10 $CP_x$ are calculated, more preferably at least 50, advantageously at least 100 and more preferably at least 1000. For example, the number of calculated $CP_x$ is between 2 and 10000, preferably between 100 and 10000, more preferably between 1000 and 10000.

In step A.3), one $TP_{target}$ to reach $m_{target}$ is selected, $TP_{target}$ being chosen among the calculated $TP_x$ and being selected such that $m_x$ is the closest to $m_{target}$. Preferably, the differences between proportions of phase present in $m_{target}$ and $m_x$ are ±3%.

In some embodiments, when at least two $TP_x$ have their $m_x$ equal, the selected $TP_{target}$ is the one having the minimum cooling power needed.

In some embodiments, when $T_{soaking}$ varies, the selected $TP_{target}$ further includes the value of $T_{soaking}$ to reach $m_{target}$, $TP_{target}$ being chosen from $TP_x$.

In some embodiments, in step A.2), the thermal enthalpy H released between mi and $m_{target}$ is calculated such that:

$$H_{released} = (X_{ferrite} * H_{ferrite}) + (X_{martensite} * H_{martensite}) + (X_{bainite} * H_{bainite}) + (X_{pearlite} * H_{pearlite}) + (H_{cementite} * X_{cementite}) + (H_{austenite} * X_{austenite})$$

X being a phase fraction.

Without willing to be bound by any theory, H represents the energy released along the all thermal path when a phase transformation is performed. It is believed that some phase transformations are exothermic and some of them are endothermic. For example, the transformation of ferrite into austenite during a heating path is endothermic whereas the transformation of austenite into pearlite during a cooling path is exothermic.

In one embodiment, in step A.2), the all thermal cycle $CP_x$ is calculated such that:

$$T(t + \Delta t) = T(t) + \frac{(\varphi_{Convection} + \varphi_{radiance})}{\rho \cdot Ep \cdot C_{pe}} \Delta t \pm \frac{Hreleased}{C_{pe}}$$

with $C_{pe}$: the specific heat of the phase (J·kg⁻¹·K⁻¹), ρ: the density of the steel (g·m⁻³), Ep: the thickness of the steel (m), φ: the heat flux (convective and radiative in W), $H_{realeased}$ (J·kg⁻¹), T: the temperature (° C.) and t: the time (s).

In some embodiments, in step A.2), at least one intermediate steel microstructure $m_{xint}$ corresponding to an intermediate thermal path $CP_{xint}$ and the thermal enthalpy $H_{xint}$ are calculated. In this case, the calculation of $CP_x$ is obtained by the calculation of a multitude of $CP_{xint}$. Thus, preferably, $CP_x$ is the sum of all $CP_{xint}$ and $H_{released}$ is the sum of all $H_{xint}$. In this preferred embodiment, $CP_{xint}$ is calculated periodically. For example, it is calculated every 0.5 seconds, preferably 0.1 seconds or less.

Figure 3:
FIG. 3 illustrates a preferred embodiment according to the invention.

FIG. 3 illustrates an embodiment, wherein in step A.2), $m_{int1}$ and $m_{int2}$ corresponding respectively to $CP_{xint1}$ and $CP_{xint2}$ as well as $H_{xint1}$ and $H_{xint2}$ are calculated. $H_{released}$ during the all thermal path is determined to calculate $CP_x$. In this embodiment, a multitude, i.e more than 2, of $CP_{xint}$, $m_{xint}$ and $H_{xint}$ can be calculated to obtain $CP_x$ (not shown).

In some embodiments, before step A.1), at least one targeted mechanical property $P_{target}$ chosen among yield strength YS, Ultimate Tensile Strength UTS, elongation, hole expansion, formability is selected. In this embodiment, preferably, $m_{target}$ is calculated based on $P_{target}$.

Without willing to be bound by any theory, it is believed that the characteristics of the steel sheet are defined by the process parameters applied during the steel production. Thus, advantageously, in step A.2), the process parameters undergone by the steel sheet before entering the heat treatment line are taken into account to calculate $CP_x$. For example, the process parameters comprise at least one element chosen from among: a cold rolling reduction rate, a coiling temperature, a run out table cooling path, a cooling temperature and a coil cooling rate.

In another embodiment, the process parameters of the treatment line that the steel sheet will undergo in the heat treatment line are taken into account to calculate $CP_x$. For example, the process parameters comprise at least one element chosen from among: the line speed, a specific thermal steel sheet temperature to reach, heating power of the heating sections, a heating temperature and a soaking temperature, cooling power of the cooling sections, a cooling temperature, an overaging temperature.

In some embodiments, $T_{cooling}$ is the bath temperature when the cooling section is followed by a hot-dip coating section comprising a hot-dip bath. Preferably, the bath is based on aluminum or based on zinc.

In some embodiments, the bath based on aluminum comprises less than 15% Si, less than 5.0% Fe, optionally 0.1 to 8.0% Mg and optionally 0.1 to 30.0% Zn, the remainder being Al.

In other embodiments, the bath based on zinc comprises 0.01-8.0% Al, optionally 0.2-8.0% Mg, the remainder being Zn.

The molten bath can also comprise unavoidable impurities and residuals elements from feeding ingots or from the passage of the steel sheet in the molten bath. For example, the optionally impurities are chosen from Sr, Sb, Pb, Ti, Ca, Mn, Sn, La, Ce, Cr, Zr or Bi, the content by weight of each additional element being inferior to 0.3% by weight. The residual elements from feeding ingots or from the passage of the steel sheet in the molten bath can be iron with a content up to 5.0%, preferably 3.0%, by weight.

In some embodiments, $T_{cooling}$ is the quenching temperature Tq. Indeed, for the Q&P steel sheet, an important point of a quenching & partitioning treatment is $T_q$.

In some embodiments, $T_{cooling}$ is between 150 and 800° C.

In some embodiments, every time a new steel sheet enters into the heat treatment line, a new calculation step A.2) is automatically performed based on the selection step A.1) performed beforehand. Indeed, the method according to the present invention adapts the cooling path to each steel sheet even if the same steel grade enters in the heat treatment line since the real characteristics of each steel often differs. The new steel sheet can be detected and the new characteristics of the steel sheet are measured and are pre-selected beforehand.

Figure 4:
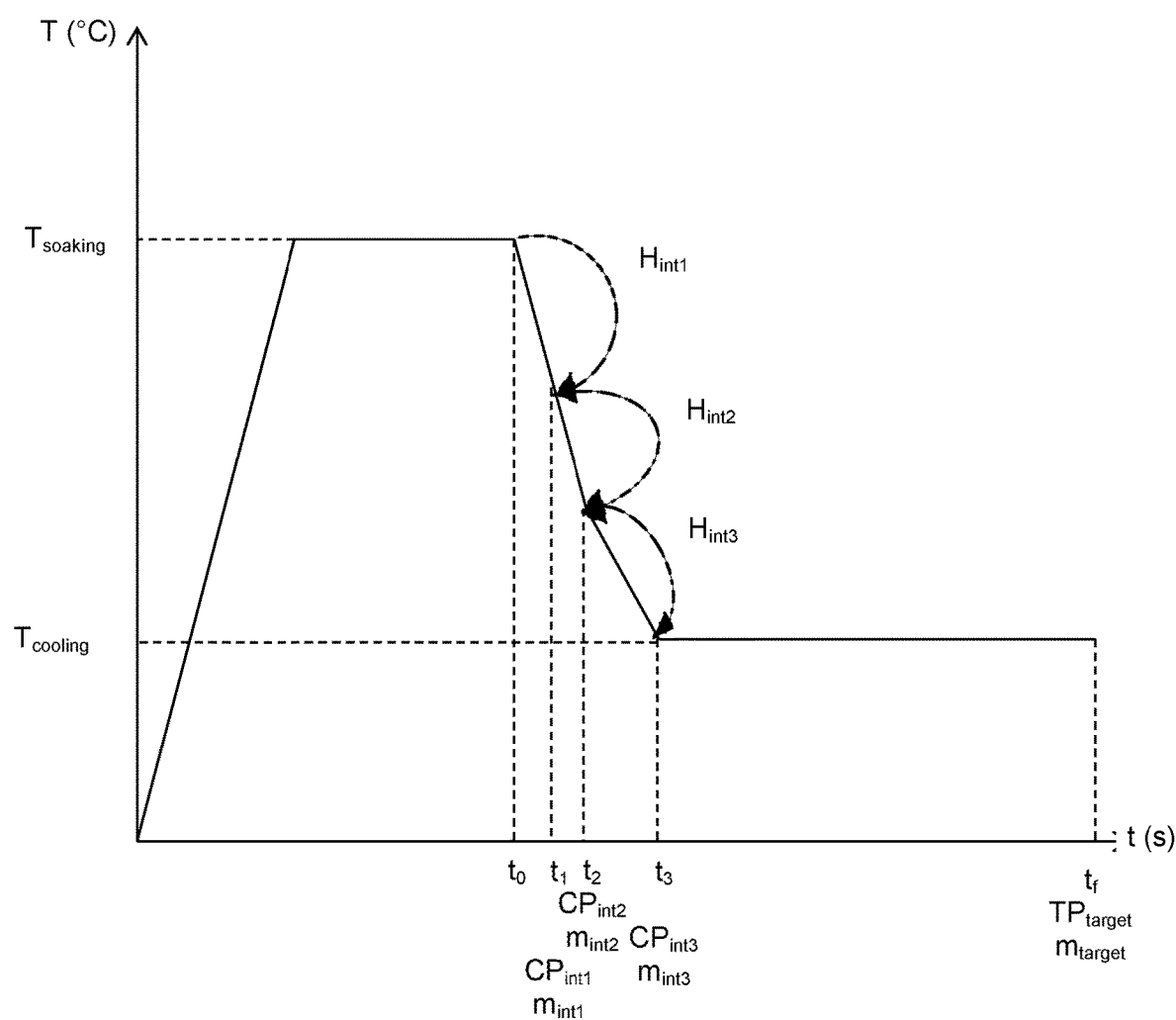
FIG. 4 illustrates an example of an embodiment according to the invention, wherein a continuous annealing is performed on a steel sheet before the deposition of a coating by hot-dip.

For example, a sensor detects the welding between two coils FIG. 4 illustrates an example of an embodiment according to the present invention, wherein a continuous annealing is performed on a steel sheet before the deposition of a coating by hot-dip. With the method according to various embodiments of the present invention, after a selection of a predefined product having a microstructure close to $m_{target}$ (not shown), a $CP_x$ is calculated based on $m_i$, the selected product and $m_{target}$. In these embodiments, intermediate thermal paths $CP_{xint1}$ to $CP_{xint3}$, corresponding respectively to $m_{xint1}$ to $m_{xint3}$, and $H_{xint1}$ to $H_{xint3}$ are calculated. $H_{realeased}$ is determined in order to obtain $CP_x$ and therefore $TP_x$. In this Figure, $TP_{target}$ is illustrated.

With the method according to various embodiments of the present invention, a thermal treatment step $TP_{target}$ is performed on the steel sheet.

The invention also provides a coil made of a steel sheet including said predefined product types, including DP, TRIP, Q&P, TWIP, CFB, PHS, TRIPLEX, DUPLEX, DP HD, such coil having a standard variation of mechanical properties below or equal to 25 MPa, preferably below or equal to 15 MPa, more preferably below or equal to 9 MPa, between any two points along the coil. Indeed, without willing to be bound by any theory, it is believed that the method including the calculation step A.2) takes into account the microstructure dispersion of the steel sheet along the coil. Thus, $TP_{target}$ applied on the steel sheet in step allows for a homogenization of the microstructure and also of the mechanical properties. Preferably, the mechanical properties are chosen from YS, UTS or elongation. The low value of standard variation is due to the precision of $TP_{target}$.

In some embodiments, the coil is covered by a metallic coating based on zinc or based on aluminum.

In some embodiments, in an industrial production, the standard variation of mechanical properties between 2 coils made of a steel sheet including said predefined product types include DP, TRIP, Q&P, TWIP, CFB, PHS, TRIPLEX, DUPLEX, DP HD measured successively produced on the same line is below or equal to 25 MPa, preferably below or equal to 15 MPa, more preferably below or equal to 9 MPa.

A thermally treatment line for the implementation of a method according to the present invention is used to perform $TP_{target}$. For example, in some embodiments, the thermally treatment line is a continuous annealing furnace.

The invention also provides a computer program product comprising at least a metallurgical module, a thermal module and an optimization module cooperating together to determine $TP_{target}$, such modules comprising software instructions that when implemented by a computer implement a method according to the present invention.

The metallurgical module predicts the microstructure ($m_x$, $m_{target}$ including metastable phases: bainite and martensite and stables phases: ferrite, austenite, cementite and pearlite) and more precisely the proportion of phases all along the treatment and predicts the kinetic of phases transformation.

The thermal module predicts the steel sheet temperature depending on the installation used for the thermal treatment, the installation being for example a continuous annealing furnace, the geometric characteristics of the band, the process parameters including the power of cooling, heating or isotherm power, the thermal enthalpy H released or consumed along the all thermal path when a phase transformation is performed.

The optimization module determines the best thermal path to reach $m_{target}$, i.e. $TP_{target}$ following the method according to the present invention using the metallurgical and thermal modules.

The invention will now be explained in examples carried out. They are not limiting.

EXAMPLE

In this example, DP780GI having the following chemical composition was chosen:

| C (%) | Mn (%) | Si (%) | Cr (%) | Mo (%) | P (%) | Cu (%) | Ti (%) | N (%) |
|---|---|---|---|---|---|---|---|---|
| 0.145 | 1.8 | 0.2 | 0.2 | 0.0025 | 0.015 | 0.02 | 0.025 | 0.06 |

The cold-rolling had a reduction rate of 50% to obtain a thickness of 1 mm.

$m_{target}$ to reach comprises 13% of martensite, 45% of ferrite and 42% of bainite, corresponding to the following $P_{target}$: YS of 500 MPa and a UTS of 780 MPa. A cooling temperature $T_{cooling}$ of 460° C. has also to be reached in order to perform a hot-dip coating with a zinc bath. This temperature must be reached with an accuracy of +/−2° C. to guarantee good coatability in the Zn bath.

Firstly, the steel sheet was compared to a list of predefined products in order to obtain a selected product having a microstructure $m_{standard}$ closest to $m_{target}$. The selected product was also a DP780GI having the following chemical composition:

| C (%) | Mn (%) | Si (%) |
|---|---|---|
| 0.15 | 1.9 | 0.2 |

The microstructure of DP780GI, i.e. $m_{standard}$, comprises 10% martensite, 50% ferrite and 40% bainite. The corresponding thermal path $TP_{standard}$ is as follows:
- a pre-heating step wherein the steel sheet is heated from ambient temperature to 680° C. during 35 seconds,
- a heating step wherein the steel sheet is heated from 680° C. to 780° C. during 38 seconds,
- soaking step wherein the steel sheet is heated at a soaking temperature $T_{soaking}$ of 780° C. during 22 seconds,
- a cooling step wherein the steel sheet is cooled with 11 jets cooling spraying $HN_x$ as follows:

| Jets | Jet 1 | Jet 2 | Jet 3 | Jet 4 | Jet 5 | Jet 6 | Jet 7 | Jet 8 | Jet 9 | Jet 10 | Jet 11 |
|---|---|---|---|---|---|---|---|---|---|---|---|
| Cooling rate (° C./s) | 13 | 10 | 12 | 7 | 10 | 14 | 41 | 26 | 25 | 16 | 18 |
| Time (s) | 1.76 | 1.76 | 1.76 | 1.76 | 1.57 | 1.68 | 1.68 | 1.52 | 1.52 | 1.52 | 1.52 |
| T (° C.) | 748 | 730 | 709 | 697 | 681 | 658 | 590 | 550 | 513 | 489 | 462 |
| Cooling power (%) | 0 | 0 | 0 | 0 | 0 | 0 | 58 | 100 | 100 | 100 | 100 |

- a hot-dip coating in a zinc bath a 460° C.,
- the cooling of the steel sheet until the top roll during 24.6 s at 300° C. and
- the cooling of the steel sheet at ambient temperature.

Then, a multitude of cooling paths $CP_x$ were calculated based on the selected product DP780GI and $TP_{standard}$, $m_i$ Of DP780 to reach $m_{target}$, the heating path, the soaking path comprising $T_{soaking}$ and $T_{cooling}$.

The cooling step of $TP_{standard}$ was recalculated using said $CP_x$ in order to obtain new thermal paths $TP_x$. After the calculation of $TP_x$, one $TP_{target}$ to reach $m_{target}$ was selected, $TP_{target}$ being chosen from $TP_x$ and being selected such that $m_x$ is the closest to $m_{target}$. $TP_{target}$ is as follows:
- a pre-heating step wherein the steel sheet is heated from ambient temperature to 680° C. during 35 seconds,
- a heating step wherein the steel sheet is heated from 680° C. to 780° C. during 38 s,
- soaking step wherein the steel sheet is heated at a soaking temperature $T_{soaking}$ of 780° C. during 22 seconds,
- a cooling step $CP_x$ comprising:

| Jets | Jet 1 | Jet 2 | Jet 3 | Jet 4 | Jet 5 | Jet 6 | Jet 7 | Jet 8 | Jet 9 | Jet 10 | Jet 11 |
|---|---|---|---|---|---|---|---|---|---|---|---|
| Cooling rate (° C./s) | 18 | 11 | 12 | 7 | 38 | 27 | 48 | 19 | 3 | 7 | 6 |
| Time (s) | 1.76 | 1.76 | 1.76 | 1.76 | 1.57 | 1.68 | 1.68 | 1.52 | 1.52 | 1.52 | 1.52 |
| T (° C.) | 748 | 729 | 709 | 697 | 637 | 592 | 511 | 483 | 479 | 468 | 458 |
| Cooling power (%) | 0 | 0 | 0 | 0 | 40 | 20 | 100 | 100 | 20 | 20 | 20 |

- a hot-dip coating in a zinc bath ä 460° C.,
- the cooling of the steel sheet until the top roll during 24.6 s at 300° C. and
- the cooling of the steel sheet until ambient temperature.

Table 1 shows the properties obtained with $TP_{standard}$ and $TP_{target}$ on the steel sheet:

| | $TP_{standard}$ | $TP_{target}$ | Expected properties |
|---|---|---|---|
| $T_{cooling}$ obtained | 462° C. | 458.09° C. | 460° C. |
| Microstructure obtained at the end of the thermal path | $X_{martensite}$: 12.83% $X_{ferrite}$: 53.85% $X_{bainite}$: 33.31% | $X_{martensite}$: 12.86% $X_{ferrite}$: 47.33% $X_{bainite}$: 39.82% | $X_{martensite}$: 13% $X_{ferrite}$: 45% $X_{bainite}$: 42% |
| Microstructure deviation with respect to $m_{target}$ | $X_{martensite}$: 0.17% $X_{ferrite}$: 8.85% $X_{bainite}$: 8.69% | $X_{martensite}$: 0.14% $X_{ferrite}$: 2.33% $X_{bainite}$: 2.18% | — |
| YS (MPa) | 434 | 494 | 500 |
| YS deviation with respect to $P_{target}$ (MPa) | 66 | 6 | — |
| UTS (MPa) | 786 | 792 | 780 |
| UTS deviation with respect to $P_{target}$ (MPa) | 14 | 8 | — |

With the method according to the present invention, it is possible to obtain a steel sheet having the desired expected properties since the thermal path $TP_{target}$ is adapted to each steel sheet. On the contrary, by applying a conventional thermal path $TP_{standard}$ the expected properties are not obtained.

What is claimed is:

1. A method for manufacturing a thermally treated steel sheet having a microstructure $m_{target}$ comprising from 0 to 100% of at least one phase chosen among: ferrite, martensite, bainite, pearlite, cementite and austenite, in a heat treatment line comprising a heating section, a soaking section and a cooling section including a cooling system, wherein a thermal path $TP_{target}$ is performed, such method comprising:

A. preparation step comprising:
   1) A selection substep, wherein:
      a. $m_{target}$ and a chemical composition are compared to a list of predefined products, whose microstructure comprises predefined phases and predefined proportion of phases, and a product having a microstructure $m_{standard}$ closest to $m_{target}$ and $TP_{standard}$ is selected, comprising at least a heating, a soaking and a cooling steps, to obtain $m_{standard}$, b. a heating path, a soaking path including a soaking temperature $T_{soaking}$, a power cooling of the cooling system and a cooling temperature $T_{cooling}$ are selected based on $TP_{standard}$ and 2) A calculation substep, wherein through variation of a cooling power, new cooling paths $CP_x$ are calculated based on the product selected in step A. 1) a and $TP_{standard}$, an initial microstructure $m_i$ of the steel sheet to reach $m_{target}$, the heating path, the soaking path comprising $T_{soaking}$ and $T_{cooling}$, the cooling step of $TP_{standard}$ is recalculated using said $CP_x$ in order to obtain new thermal paths $TP_x$, each $TP_x$ corresponding to a microstructure $m_x$.

3) A selection substep wherein one $TP_{target}$ to reach $m_{target}$ is selected, $TP_{target}$ being chosen among the calculated thermal paths $TP_x$ and being selected such that $m_x$ is the closest to $m_{target}$, and B. a thermal treatment step wherein $TP_{target}$ is performed on the steel sheet, wherein in step A.2), a thermal enthalpy H released between $m_i$ and $m_{target}$ is calculated such that:

$H_{released} = (X_{ferrite} * H_{ferrite}) + (X_{martensite} * H_{martensite}) + (X_{bainite} * H_{bainite}) + (X_{pearlite} * H_{pearlite}) + (H_{cementite} * X_{cementite}) + (H_{austenite} * X_{austenite})$, X being a phase fraction.

2. A method according to claim 1, wherein the predefined phases in step A.1), are defined by at least one element chosen from: a size, a shape, a chemical and a composition.

3. A method according to claim 1, wherein $TP_{standard}$ further comprises a pre-heating step.

4. A method according to claim 1, wherein $TP_{standard}$ further comprise a hot-dip coating step, an overaging step, a tempering step, or a partitioning step.

5. A method according to claim 1, wherein the microstructure $m_{target}$ comprises:
100% of austenite, or
from 5 to 95% of martensite, from 4 to 65% of bainite, the balance being ferrite, or
from 8 to 30% of residual austenite, from 0.6 to 1.5% of carbon in solid solution, the balance being ferrite, martensite, bainite, pearlite and/or cementite, or
from 1% to 30% of ferrite and from 1% to 30% of bainite, from 5 and 25% of austenite, the balance being martensite, or
from 5 to 20% of residual austenite, the balance being martensite, or
ferrite and residual austenite, or
residual austenite and intermetallic phases, or
from 80 to 100% of martensite and from 0 to 20% of residual austenite, or
100% martensite, or
from 5 to 100% of pearlite and from 0 to 95% of ferrite, or
at least 75% of equiaxed ferrite, from 5 to 20% of martensite and bainite in amount less than or equal to 10%.

6. A method according to claim 1, wherein said predefined product types comprise a Dual Phase steel, a Transformation Induced Plasticity steel, a Quenched & Partitioned steel, a Twins Induced Plasticity steel, a Carbide Free Bainite steel, a Press Hardening Steel, a TRIPLEX, DUPLEX and Dual Phase High Ductility DP steels.

7. A method according to claim 1, wherein in step A.2), the cooling power of the cooling system varies from a minimum to a maximum value.

8. A method according to claim 1, wherein in step A.2), the cooling power of the cooling system varies from a maximum to a minimum value.

9. A method according to claim 1, wherein in step A.1.b), $T_{soaking}$ is a fixed number selected from the range between 600 to 1000° C.

10. A method according to claim 1, wherein in step A.1.b), $T_{soaking}$ varies from 600 to 1000° C.

11. A method according to claim 10, wherein after step A.2), a further calculation sub-step is performed wherein:
a. $T_{soaking}$ varies from in a predefined range value chosen from 600 to 1000° C. and
b. For each $T_{soaking}$ variation, new cooling paths $CP_x$ are calculated, based on the selected product in step A.1) a and $TP_{standard}$, the initial microstructure mi of the steel sheet to reach $m_{standard}$ and $T_{cooling}$, the cooling step of $TP_{standard}$ is recalculated using said $CP_x$ in order to obtain new thermal paths $TP_x$, each $TP_x$ corresponding to a microstructure $m_x$.

12. A method according to claim 11, wherein in the selection step A.3), the selected $TP_{target}$ further includes the value of $T_{soaking}$.

13. A method according to 12, wherein in step A.3), when at least two $CP_x$ have their $m_x$ equal, the selected $TP_{target}$ is the one having the minimum cooling power needed.

14. A method according to claim 1, wherein in step A.2), the differences between proportions of phase present in $m_{target}$ and $m_x$ is +3%.

15. A method according to claim 1, wherein in step A.2), the new cooling paths $CP_x$ are calculated such that:

$$T(t + \Delta t) = T(t) + \frac{(\varphi_{Convection} + \varphi_{radiance})}{\rho \cdot E_p \cdot C_{pe}} \Delta t \pm \frac{H_{released}}{C_{pe}}$$

with $C_{pe}$: the specific heat of the phase $(J \cdot kg^{-1} \cdot K^{-1})$, $\rho$: the density of the steel $(g \cdot m^{-3})$, $E_p$: thickness of the steel (m), $\varphi$: the heat flux (convective and radiative in W), $H_{realeased}$: enthalpy released $(J \cdot kg^{-1})$, T: temperature (° C.), t: time(s), and $\Delta t$: change in time.

16. A method according to claim 1, wherein in step A.2), at least one intermediate steel microstructure $m_{xint}$ corresponding to an intermediate cooling path $CP_{xint}$ and the thermal enthalpy $H_{xint}$ are calculated.

17. A method according to claim 16, wherein in step A.2), $CP_x$ is the sum of all $CP_{xint}$, and $H_{released}$ is the sum of all $H_{xint}$.

18. A method according to claim 1, wherein before step A.1.a), at least one targeted mechanical property $P_{target}$ chosen among yield strength YS, Ultimate Tensile Strength UTS, elongation hole expansion, and formability is selected.

19. A method according to claim 18, wherein $m_{target}$ is calculated based on $P_{target}$.

20. A method according to claim 1, wherein in step A.2), the process parameters undergone by the steel sheet before entering the heat treatment line are taken into account to calculate $CP_x$.

21. A method according to claim 20, wherein the process parameters comprise at least one element chosen from among: a cold rolling reduction rate, a coiling temperature, a run out table cooling path, a cooling temperature and a coil cooling rate.

22. A method according to claim 1, wherein in step A.2) the process parameters of the treatment line that the steel sheet will undergo in the heat treatment line are taken into account to calculate $CP_x$.

23. A method according to claim 22, wherein the process parameters comprise at least one element chosen from among: a specific thermal steel sheet temperature to reach, the line speed, cooling power of the cooling sections, heating power of the heating sections, an overaging temperature, a cooling temperature, a heating temperature and a soaking temperature.

24. A method according to claim 1, wherein the cooling system comprises at least one jet cooling, at least one cooling spray or at least both.

25. A method according to claim 24, wherein when the cooling system comprises at least one jet cooling, the jet cooling sprays a gas, an aqueous liquid or a mixture thereof.

26. A method according to claim 25, wherein the gas is chosen from air, $HN_x$, $H_2$, $N_2$, Ar, He, steam water or a mixture thereof.

27. A method according to claim 26, wherein the aqueous liquid is chosen from water or a nanofluid.

28. A method according to claim 26, wherein the jet cooling sprays air with a debit flow between 0 and 350000 $Nm^3/h$.

29. A method according to claim 1, wherein $T_{cooling}$ is the bath temperature when the cooling section is followed by a hot-dip coating section comprising a hot-dip bath.

30. A method according to claim 29, wherein the bath is based on aluminum or based on zinc.

31. A method according to claim 1, wherein $T_{cooling}$ is the quenching temperature $T_q$.

32. A method according to claim 1, wherein $T_{cooling}$ is between 150 and 800° C.

33. A method according to claim 1, wherein every time a new steel sheet enters into the heat treatment line, a new calculation step A.2) is automatically performed based on the selection step A.1) performed beforehand.

34. A method according to claim 33, wherein an adaptation of the cooling path is performed as the steel sheet enters into the cooling section of the heat treatment line on the first meters of the sheet.

35. A method for manufacturing a thermally treated steel sheet having a microstructure $m_{target}$ comprising from 0 to 100% of at least one phase chosen among: ferrite, martensite, bainite, pearlite, cementite and austenite, in a heat treatment line comprising a heating section, a soaking section and a cooling section including a cooling system, wherein a thermal path $TP_{target}$ is performed, such method comprising:

A. preparation step comprising:
1) A selection substep, wherein:
a. $m_{target}$ and a chemical composition are compared to a list of predefined products, whose microstructure comprises predefined phases and predefined proportion of phases, and a product having a microstructure $m_{standard}$ closest to $m_{target}$ and $TP_{standard}$ is selected, comprising at least a heating, a soaking and a cooling steps, to obtain $m_{standard}$,
b. a heating path, a soaking path including a soaking temperature $T_{soaking}$, a power cooling of the cooling system and a cooling temperature $T_{cooling}$ are selected based on $TP_{standard}$ and
2) A calculation substep, wherein through variation of a cooling power, new cooling paths $CP_x$ are calculated based on the product selected in step A.1) a and $TP_{standard}$, an initial microstructure mi of the steel sheet to reach $m_{target}$, the heating path, the soaking path comprising $T_{soaking}$ and $T_{cooling}$, the cooling step of $TP_{standard}$ is recalculated using said $CP_x$ in order to obtain new thermal paths $TP_x$, each $TP_x$ corresponding to a microstructure $m_x$,
3) A selection substep wherein one $TP_{target}$ to reach $m_{target}$ is selected, $TP_{target}$ being chosen among the calculated thermal paths $TP_x$ and being selected such that $m_x$ is the closest to $m_{target}$, and
B. a thermal treatment step wherein $TP_{target}$ is performed on the steel sheet, wherein in step A.2), the new cooling paths $CP_x$ are calculated such that:

$$T(t + \Delta t) = T(t) + \frac{(\varphi_{Convection} + \varphi_{radiance})}{\rho \cdot Ep \cdot C_{pe}} \Delta t \pm \frac{H_{released}}{C_{pe}}$$

with $C_{pe}$: the specific heat of the phase ($J \cdot kg^{-1} \cdot K^{-1}$), $\rho$: the density of the steel ($g \cdot m^{-3}$), $E_p$: thickness of the steel (m), $\varphi$: the heat flux (convective and radiative in W), $H_{realeased}$: enthalpy released ($J \cdot kg^{-1}$), T: temperature (° C.), t: time(s), and $\Delta t$: change in time(s).

* * * * *